March 18, 1969   G. F. RADEMACHER   3,433,515
HIGH TEMPERATURE-PRESSURE METAL-TO-GLASS SEAL CONSTRUCTIONS
Filed June 29, 1966

INVENTOR.
BY Gustav F. Rademacher
Peter P. Kozak
ATTORNEY

United States Patent Office 3,433,515
Patented Mar. 18, 1969

3,433,515
HIGH TEMPERATURE-PRESSURE METAL-TO-GLASS SEAL CONSTRUCTIONS
Gustav F. Rademacher, Davison, Mich., assignor to General Motors Corporation, Detroit, Mich., a corporation of Delaware
Filed June 29, 1966, Ser. No. 561,524
U.S. Cl. 287—189.365          2 Claims
Int. Cl. F16b 11/00

ABSTRACT OF THE DISCLOSURE

A metal-to-glass seal construction suitable for use under pressure at high temperatures as electrical lead-in equipment. The construction consists of an outer tubular metal member which is resistant to environmental conditions, such as stainless steel. Positioned inside the outer metal member is a cylindrical metal member which has a coefficient of thermal expansion similar to glass, such as Kovar, having one end brazed to the outer tubular metal member. The other end of the inner cylindrical member contains a fused mass of glass therein which hermetically seals the inside of the inner cylindrical member. A conducting rod which has a coefficient of thermal expansion similar to glass passes through the glass mass in spaced relationship to the cylindrical member.

---

This invention relates to metal-to-glass seal constructions, and more particularly to fused hermetic metal-to-glass seal constructions adapted to operate under super-atmospheric pressure at high temperatures which are suitable for use in igniters and other electrical lead-in equipment.

Metal-to-glass seals have been widely used for electrical lead-in equipment which is operated under super-atmospheric pressure at temperatures up to 200° C. Heretofore, metal-to-glass seals have not been used successfully at temperatures in the range of 200 to 400° C. when exposed to pressures of 50 p.s.i. or higher due to the failure of the metal-to-glass seal in providing a hermetic or air-tight seal. At temperatures in the range of 200 to 400° C. and pressures of 50 p.s.i. or higher, the conventionally used oxidation-resistance metals, such as stainless steel and the like, usually separate from the glass due to the difference in the thermal coefficient of expansion of the glass and the stainless steel, thereby providing a space for the gas which is under pressure to pass or leak through. The leakage of the hot gas under pressure heats the metal and the glass even more, thereby causing the space between the metal and the glass to become larger and resulting in the catastrophic failure of the seal.

Metal-to-glass seals in which the metal has a coefficient of expansion similar to that of glass are well known. Heating this type of metal-to-glass seal does not cause a separation between the metal and the glass which results in gas leakage. However, metals such as Kovar, an iron based alloy with 28 to 30% nickel, 15 to 18% cobalt and fractional percentages of manganese, which have a coefficient of expansion similar to that of glass usually oxidize readily at these temperatures in the presence of air. As a result, it is not practical to use a metal such as Kovar in a metal-to-glass seal which is exposed to the air or an oxidizing atmosphere at elevated temperatures.

Igniters, which are used as electrical lead-ins for the ignition in the combustion chamber of gas turbine engines, are an example where metal-to-glass seals have had limited use in the past due to the leakage. The trend of running gas turbine engines and other equipment at higher temperatures in order to increase their efficiency requires that the electrical lead-in equipment contain a seal adapted to be operative under pressure at elevated temperatures thereby preventing the gas from passing through the lead-in equipment and preventing the lead-in equipment from overheating.

It is the basic object of this invention to provide a metal-to-glass seal construction adapted to operate under pressure at elevated temperatures. It is another object of this invention to provide a strong, durable pressure-resistant metal-to-glass seal construction which is simple in construction. It is yet another object of this invention to provide a meal-to-glass seal construction adapted to operate under pressure at temperatures up to the softening point temperatures of the glass. It is still another object of this invention to provide an igniter having a metal-to-glass seal construction for use in gas turbine engines which can withstand elevated temperatures and pressures.

These and other objects are accomplished by a metal-to-glass seal construction comprising an outer tubular metal member chosen to resist the environmental atmosphere, such as a stainless steel tube. Positioned within and in close proximity to the stainless steel tube is a Kovar sleeve. Positioned in the center of the Kovar sleeve so as not to be in electrical contact therewith is a Kovar rod. One end of the Kovar sleeve is connected to the tubular metal member to form a leak-proof connection. A fused mass of glass is positioned in the other or floating end of the Kovar sleeve, completely filling and hermetically sealing the inside of the Kovar sleeve with respect to the Kovar rod. At temperatures in the range of 200 to 400° C. the stainless steel tube, which has a higher coefficient of thermal expansion than the Kovar sleeve, expands away from the Kovar sleeve at the floating end. No gas can pass between the stainless steel tube and the Kovar sleeve since one end of the Kovar sleeve is connected to the stainless steel in an air-tight manner. No gas can pass through the Kovar sleeve at elevated temperatures because there is no appreciable difference between the coefficient of thermal expansion of the glass mass and the Kovar sleeve and Kovar rod which would cause an expansion crack between these parts of the seal.

Other objects and advantages of this invention will be apparent from the following detailed description, reference being made to the accompanying drawings wherein a preferred embodiment of this invention is shown.

Figure 1:
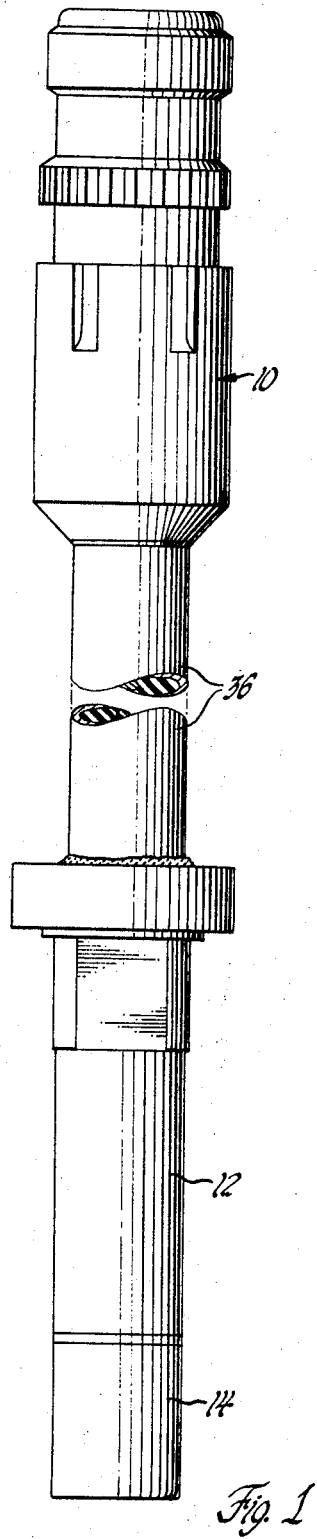
FIGURE 1 is an elevational view of an igniter showing the portion thereof wherein the metal-to-glass seal construction is located.

Referring now to FIGURE 1 of the drawings, the igniter 10 comprises a conventional stainless steel shell 12 having the lower end thereof constituting an annular ground electrode 14.

Figure 2:
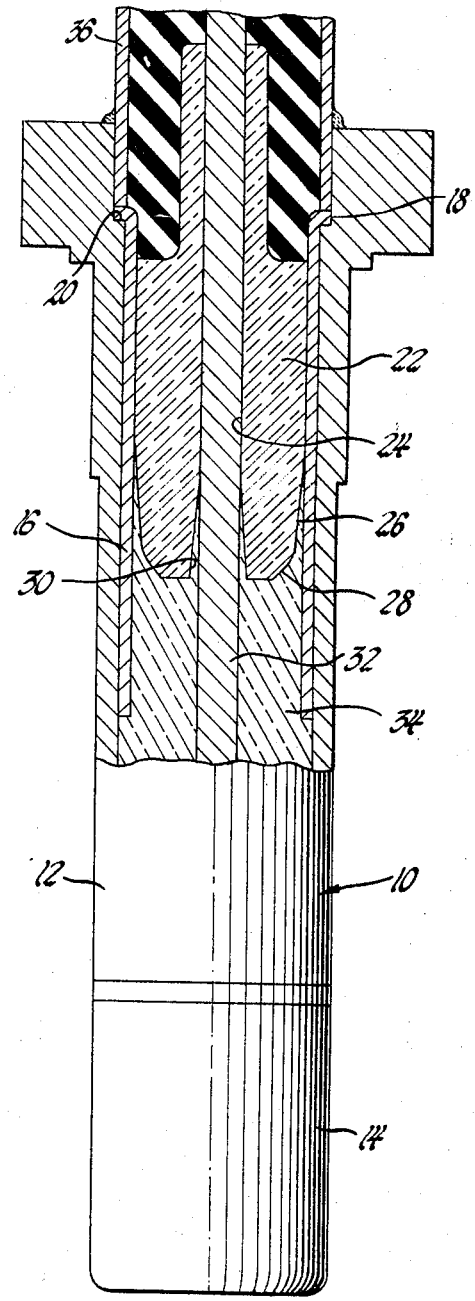
FIGURE 2 is an enlarged view of the lower portion of FIGURE 1 with parts broken away and in section.

As shown in FIGURE 2, the metal-to-glass seal construction comprises an outer tubular stainless steel shell 12 having a Kovar sleeve 16 positioned therein and in touching relationship thereto. The shell 12 is constructed of a metal which is resistant to environmental conditions, that is, a metal able to withstand elevated temperatures, and corrosive and/or oxidizing atmospheres. Stainless steel is a preferred metal although other metals such as Inconel, silver, gold, and the like may be used. Stainless steel has a coefficient of thermal expansion of $13 \times 10^{-6}$ per degree C. over the normal operating range. The sleeve 16 is made of Kovar in the preferred embodiment. Kovar has a coefficient of thermal expansion of $6.0 \times 10^{-6}$ per degree C. As mentioned previously, Kovar is an iron based alloy containing 28 to 30% nickel, 15 to 18% cobalt and fractional percentages of manganese. Other metals having a coefficient of expansion similar to that of glass may be used. Molybdenum having a linear coefficient of thermal expansion of $4.9 \times 10^{-6}$ and tungsten having a coefficient of $4.3 \times 10^{-6}$ per degree C. may also be used. The upper flange end 18 of the Kovar sleeve 16 is brazed to the mating step 20 of the shell 12 thereby making a permanent, air-tight seal. A stainless steel tube 36 is positioned on top of and brazed to the upper flange end 18.

Positioned within the Kovar sleeve 16 is a ceramic insulator 22 having a centerbore 24 therethrough. The ceramic insulator 22 should preferably be of a high alumina base material containing upwards of 85% aluminum oxide such, for example, as covered by United States Patent 2,760,875, issued to Karl Schwartzwalder and Helen Blair Barlett. Such an insulator has excellent mechanical strength and heat shock resistance along with the ability to form an excellent bond with glass, all of these characteristics being of considerable advantage in forming the metal-to-glass seal of this invention. The coefficient of thermal expansion for an alumina insulator of this type is $7.0 \times 10^{-6}$ per degree C. The lower portion of the insulator 22 has a tapered outer diameter 26 which is tapered at an angle of 5 to 10°. The lower tip of the insulator 22 has a tapered outer diameter 28 which is tapered at an angle of approximately 45°. The insulator 22 also has a tapered inner diameter 30 on the lower end of the insulator centerbore 24 which is tapered at an angle of 5 to 10°. The angles of the tapered outer diameter and tapered inner diameter on the insulator 22 are not critical. The purpose of the tapered dimension is to channel or direct the flow of the softened and highly viscous glass to a narrow space separating the insulator from the Kovar sleeve and the Kovar rod. The narrow space between the insulator and the Kovar sleeve and rod effectively combines with the viscous glass that is forced therebetween to form an air-tight seal even though the glass has softened to be a viscous liquid. This feature of having the insulator sides tapered to direct the flow of the soft glass is not essential to the practice of this invention but it is in the preferred embodiment since it enables the metal-to-glass seal to function at a temperature at which the glass has softened and become a viscous fluid.

Positioned within the insulator centerbore 24 is a Kovar rod 32 which serves to conduct the electricity through the metal-to-glass seal construction. Kovar is preferred for the rod 32, although the same metals may be used for the rod 32 as are used for the sleeve 16. Glass 34 is in sealing contact with the shell 12, the Kovar sleeve 16, the insulator 22 and the Kovar rod 32. The glass in the metal-to-glass seal construction is the conventional borosilicate-type glass commonly known as Pyrex, which is presently being used in the production of igniter plugs. The composition of the preferred borosilicate glass is 65% by weight $SiO_2$, 23% by weight $B_2O_3$, 5% by weight $Al_2O_3$ and 7% by weight $Na_2O$. Other glass frit compositions may be used in the seal as long as they have a linear coefficient of thermal expansion similar to the $6.5 \times 10^{-6}$ per degree C. value for the glass described above. The temperature to which this metal-to-glass seal construction may be effectively used is directly related to the softening temperature of the glass used. For example, a metal-to-glass seal construction containing a glass frit which softens at 600° C. can be used at temperatures approximately 200° higher than a glass frit which softens at 400° C. In other words, the softening temperature of the glass determines the maximum temperature at which the metal-to-glass seal construction may be operated.

In accordance with the practice of this invention, the metal-to-glass seal construction shown in FIGURE 2 functions in the following manner. At low temperatures, and temperatures at which there are no expansion cracks between the shell 12 and the fused glass mass 34, the glass mass 34 provides an air-tight seal with the stainless steel shell 12 and the Kovar rod 32 thereby preventing any gas from passing up the igniter from the ground electrode region 14. At elevated temperatures, in the range of 200 to 400° C. wherein the stainless steel shell 12 expands away from the glass mass 34, gas under a pressure of approximately 100 p.s.i. passes through the expansion crack between the stainless steel shell 12 and the glass mass 34. Then the gas passes up between the shell 12 and the lower floating end of the Kovar sleeve 16 which has also been separated at elevated temperatures due to the difference in the coefficient of thermal expansion between the stainless steel and the Kovar. The gas proceeds up the expansion space between the Kovar sleeve 16 and the stainless steel shell 12 up to the upper end 18 of the Kovar sleeve. Since the Kovar sleeve 18 is sealingly brazed to the shell at the shoulder 20, the gas is unable to pass beyond this point.

The gas is also unable to pass up the Kovar sleeve between the glass mass and the Kovar sleeve and between the glass mass and the Kovar rod because there is no separation therebetween due to thermal expansion since their coefficients of thermal expansion are similar. As a result, gas from the combustion chamber cannot pass up the igniter either on the inside of the Kovar sleeve or on the outside of the Kovar sleeve beyond the sleeve end which is brazed to the stainless steel shell. As mentioned previously, the tapered feature of the insulator enables the metal-to-glass seal to retain its sealing integrity even though the glass may become plastic at elevated temperatures by directing or wedging the flow of the viscous glass between the Kovar elements and the insulator so that no gas can pass through, that is, the viscous glass is forced up into these spaces formed by the tapered insulator sides and the Kovar elements until the space is too narrow for the viscous glass to flow any farther. As a result, the opening between the insulator and the Kovar part becomes too narrow for the viscous glass to pass through which in turn prevents the gas under pressure from passing between the Kovar sleeve and insulator as well as between the Kovar rod and the insulator.

The method of making the metal-to-glass seal construction in accordance with this invention is as follows. A flared Kovar sleeve 16 is placed around the Kovar rod 32 in the stainless steel shell 12 so that the flared end 18 of the sleeve 16 stops at the mating step 20 of the shell 12. The space between the Kovar rod 32 and the shell 12 is partially filled with a glass powder. An insulator 22 is positioned on top of the glass powder in a manner such that the insulator centerbore 24 encircles the Kovar rod 32. This assembly is placed in an oven and heated until the glass powder becomes a viscous fluid. The assembly is then removed from the oven and the insulator is pressed down to compress the viscous molten glass thereby forcing the glass up into the space between the inner walls of the Kovar sleeve 16 and the outside walls of the insulator 22 formed by the tapers at 26 and 28. Similarly, the molten glass is forced up between the outer surface of the Kovar rod 32 and the insulator centerbore wall 24 at the tapered portion 30. The glass is also forced into bonding relationship with the walls of the stainless steel shell 12. The insulator forces the glass into all the empty spaces within the Kovar sleeve and within the stainless steel shell 12. A stainless steel outer tubing 36 is inserted into the shell 12 to rest on the flanged end 18 of the Kovar sleeve 16 near the shoulder 20. The tubing 36 is welded to the flanged end 18 and to the shell 12.

While the invention has been described in terms of a preferred embodiment, it is to be understood that it is not limited thereby.

I claim:

1. A metal-to-glass seal construction adapted to operate under superatmospheric pressure at elevated temperatures comprising an outer tubular metal member, said outer tubular member resistant to environmental conditions, a cylindrical metal member having a first end and a second end positioned inside and adjacent to said outer tubular member, said first end brazed to said outer member in an air-tight manner to prevent gas under pressure from passing between said tubular member and said cylindrical member at elevated temperatures, an insulator having a centerbore therethrough positioned inside and adjacent to said cylindrical metal member, a rod positioned in said insulator centerbore, said insulator having an end portion, said insulator end portion having a tapered outer diameter to provide a first space between said cylindrical member and said end portion and a tapered inner diameter to provide a second space between said rod and said end portion, and a fused mass of glass positioned within the second end of said cylindrically member, said glass mass positioned in said first space and said second space, said glass mass becoming molten at elevated temperatures and forced by gas under pressure to sealingly fill said first space and said second space, said glass and said cylindrical member and said rod having substantially the same coefficient of thermal expansion.

2. A metal-to-glass seal construction adapted to operate under superatmospheric pressure at elevated temperatures comprising an outer tubular stainless steel member, said outer stainless steel member resistant to environmental conditions, a cylindrical Kovar member having a first end and a second end positioned inside and adjacent to said outer tubular member, said first end brazed to said outer member in an air-tight manner to prevent gas from passing between said tubular member and said cylindrical member at elevated temperatures, an insulator having a centerbore therethrough positioned inside and adjacent to said cylindrical Kovar member, a Kovar rod positioned in said insulator centerbore, said insulator having an end portion, said insulator end portion having a tapered outer diameter to provide a first space between said cylindrical Kovar member and said end portion and a tapered inner diameter to provide a second space between said Kovar rod and said end portion, and a fused mass of glass positioned within and bonded to said second end of said cylindrical member and Kovar rod, said glass mass positioned in said first space and said second space, said glass mass becoming molten at elevated temperatures and forced by gas under pressure to sealingly fill said first space and said second space.

References Cited
UNITED STATES PATENTS

| | | | |
|---|---|---|---|
| 2,508,354 | 5/1950 | Brinson | 287—189.365 |
| 2,583,388 | 1/1952 | Nelson et al. | 287—189.365 |
| 2,728,425 | 12/1955 | Day | 287—189.365 |
| 2,744,592 | 5/1956 | Remond | 287—189.365 |
| 2,770,923 | 11/1956 | Dalton et al. | 287—189.365 |

CARL W. TOMLIN, *Primary Examiner.*

WAYNE L. SHEDD, *Assistant Examiner.*

U.S. Cl. X.R.

206—2.3